United States Patent [19] [11] 4,382,386
Coussot et al. [45] May 10, 1983

[54] ELASTIC SURFACE WAVE PRESSURE GAUGE AND PRESSURE SENSOR FOR SUCH A GAUGE

[75] Inventors: Gerard Coussot; Pierre Texier, both of Paris, France

[73] Assignee: Thomson-CSF, Paris, France

[21] Appl. No.: 190,893

[22] Filed: Sep. 25, 1980

[30] Foreign Application Priority Data

Sep. 28, 1979 [FR] France .................. 79 24226

[51] Int. Cl.³ .................. G01L 11/00; H01L 41/10; G01L 9/06
[52] U.S. Cl. .................. 73/703; 310/313 B; 310/313 A; 310/353; 73/DIG. 4
[58] Field of Search .......... 29/833, 834; 310/313 R, 310/313 A, 313 B, 353, 348; 73/703, 654, DIG. 4

[56] References Cited

U.S. PATENT DOCUMENTS

| 3,656,232 | 4/1972 | Hinchey | 29/833 |
| 3,695,502 | 10/1972 | Gaiser | 29/834 |
| 3,723,920 | 3/1973 | Sheahaw et al. | 310/353 |
| 3,817,107 | 6/1974 | Shimada et al. | 73/398 HR |
| 3,885,173 | 5/1975 | Lee | 310/313 B |
| 3,974,463 | 8/1976 | Onodera et al. | 310/313 A X |
| 4,047,129 | 9/1977 | Ishiyama | 310/313 B |
| 4,085,620 | 4/1978 | Tanaka | 73/727 |
| 4,100,811 | 7/1978 | Cullen et al. | 73/DIG. 4 X |
| 4,106,343 | 8/1978 | Cook | 73/387 |
| 4,193,045 | 3/1980 | Houkawa et al. | 310/313 B |
| 4,216,401 | 8/1980 | Wagner | 310/313 R |
| 4,245,201 | 1/1981 | Takahashi et al. | 310/313 B |
| 4,314,215 | 2/1982 | Tanji et al. | 310/313 R |
| 4,317,372 | 3/1982 | Hartemann | 73/703 |
| 4,326,423 | 4/1982 | Hartemann | 73/721 X |
| 4,331,022 | 5/1982 | Coussot et al. | 73/4 R |

FOREIGN PATENT DOCUMENTS 52-37768 3/1977 Japan .................. 29/833

Primary Examiner—Anthony V. Ciarlante
Assistant Examiner—David U. Carlson
Attorney, Agent, or Firm—Cushman, Darby & Cushman

[57] ABSTRACT

The invention relates to elastic surface wave pressure gauges.

The gauge comprises a plate on which are located the electronic components of the gauge and a pressure sensor grouping the electromechanical elements on a header having connecting pins. The header is provided with a pressure inlet which traverses the plate.

The invention is also applicable to the measurement of the pressures of fluids in order to optimize the supply to internal combustion engines. The pressure inlet is made of a rigid metal header and separately grounded for shielding of the surface acoustic wave electrodes to prevent "pull-in" where the oscillators inadvertantly lock on the same frequency.

13 Claims, 4 Drawing Figures

ELASTIC SURFACE WAVE PRESSURE GAUGE AND PRESSURE SENSOR FOR SUCH A GAUGE

BACKGROUND OF THE INVENTION

The present invention relates to pressure gauges in which the sensitive element comprises a thin wafer of piezoelectric material. The wafer is elastically deformed as a result of the pressures exerted on its faces. To obtain an electrical measuring signal whose frequency is proportional to the differential pressure exerted on the deformable wafer four sets of interdigitated comb shaped transducers are deposited on one of its faces so as to form two elastic surface wave delay lines. By looping two amplifiers by means of these delay lines two oscillators are obtained, whose oscillating frequencies are sensitive to the deformations undergone by the wafer. The signals supplied by the oscillators are applied to a mixer stage, which provides a measuring signal, whose frequency is equal to the difference between the incident signals. This measuring procedure uses oscillating frequencies of several tens megahertz, but the frequency showing the differential pressure is considerably lower. As a result it is very difficult to construct such a gauge because it is necessary to operate two oscillators having frequencies which are very close to one another without them pulling in.

The construction is made all the more difficult by the fact that it is necessary to ensure a good manufacturing reproducibility and in no way excessive manufacturing costs. The dimensions of the components of the gauge have been reduced to reduce manufacturing costs. However, this miniaturization imposes a very careful choice of the mechanical and electrical assembly modes, because these modes directly influence the satisfactory operation of the products and their rational manufacture.

BRIEF SUMMARY OF THE INVENTION

The invention relates to an elastic surface wave pressure gauge incorporating two delay lines formed by means of interdigitated comb shaped transducer electrodes placed on one main face of a piezoelectric wafer, the wafer resting by its other main face on the periphery of a chamber communicating with a pressure inlet, said delay lines being respectively connected to two amplifier circuits in order that the latter oscillate at two frequencies. The difference between these frequencies being detected by a mixer stage which supplies the measuring signal, wherein the amplifier circuits and the mixer stage are grouped on a plate provided with connections surrounding an orifice providing a passage for the pressure inlet, the passage being constituted by a pipe fixed to a rigid metal header, whose periphery is provided with pins which are inserted in the said connections, the header having a support for the piezoelectric wafer between the pins, whilst this support has a central depression communicating with the pipe.

The invention also relates to an elastic surface wave pressure sensor incorporating a pressure inlet, a piezoelectric wafer provided with interdigitated comb transducer electrodes forming on one of its main faces two delay lines which are sensitive to deformations and a wafer header having a cavity linking the other face of the wafer and the pressure inlet, wherein the header is a rigid metal header which is peripherally provided with connecting pins surrounding a central pipe fixed to the header by one of its faces, the other face of the header having a depression which is connected to the pipe, the wafer resting on the edge of the depression and between the extensions of connecting pins.

BRIEF DESCRIPTION OF THE DRAWINGS

The invention is described in greater detail hereinafter relative to non-limitative embodiments and the attached drawings, wherein.

DETAILED DESCRIPTION OF THE PREFERRED EMBODIMENTS

Figure 1:
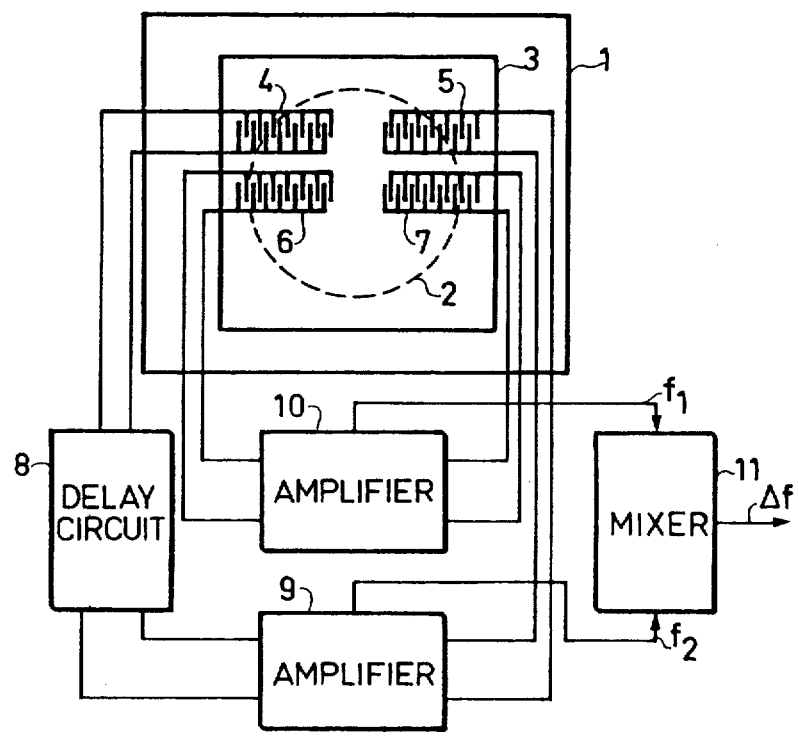
FIG. 1 is a circuit diagram of an elastic surface wave pressure gauge.
Figure 2:
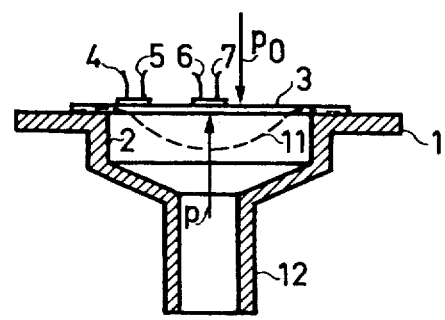
FIG. 2 is an explanatory drawing.

FIG. 1 is a circuit diagram of an elastic surface wave pressure gauge. The pressure-sensitive element is a piezoelectric wafer 3, made from quartz or lithium niobate resting on a header 1. Header 1 has a depression, whose circumference 2 is indicated in dotted line form in FIG. 1. FIG. 2 shows that the depression of header 1 is connected to a pressure inlet 12. Wafer 3 can be fixed to header 1 by an adhesive joint ensuring the sealing of the cavity between header 1 and wafer 3. This fixing method ensures a good fitting of the edges of wafer 3. When pressures $p_o$ and p are applied to the main faces of wafer 3, the wafer is deformed in the manner shown by the dotted lines in FIG. 2. Electrodes in the form of interdigitated comb transducers are placed on the upper face of wafer 3 to sense the difference between the pressures $p_o$ and p. These electrodes cooperate with the underlying piezoelectric material to form electromechanical transducers which are able to change the elastic surface waves. Transducers 6 and 7 form a first delay line, whose delay time $\tau_1$ varies as a function of the central deformation of wafer 3. Transducers 4 and 5 form a second delay line, whose delay time $\tau_2$ varies as a function of the peripheral deformation of wafer 3. An amplifier 10 cooperates with the first delay line 6, 7 so as to form a first oscillating loop which oscillates at a frequency $f_1$ dependent on the variation of $\tau_1$. An amplifier 9 cooperates with the second delay line 4, 5 and a device 8 introduces a supplementary delay adjustable so as to form a second oscillating loop which oscillates at a frequency $f_2$, dependent on the variation of $\tau_2$. A mixer 11 receives oscillating signals supplied by the two oscillating loops 6, 7, 10 and 4, 5, 8, 9 and supplies a measuring signal S, whose frequency $\Delta f$ is equal to the difference between the incident frequencies $f_1$ and $f_2$.

As the peripheral and central deformations of wafer 3 are clearly differentiated it is readily apparent that the frequency $\Delta f$ supplied by the pressure gauge can be written in the following form:

$$\Delta f = K(p - p_o) + C$$

in which K is proportionality factor and C is a constant, whose value is adjusted by means of device 8.

As a non-limitative example and with a quartz wafer or plate 3 with a thickness of 250 microns covering a depression 2 of diameter 1 cm, frequencies $f_1$ and $f_2$ are obtained of approximately 105 MHz. The factor K then equals 40 kHz/Bar. If $p_o$ is atmospheric pressure, the gauge measures the vacuum at pressure inlet 12. If pressure $p_o$ is zero the gauge measures the absolute pressure p at pressure inlet 12.

Bearing in mind the information given hereinbefore it is apparent that the mass production of pressure gauges causes a number of technological problems.

Thus, for factor K to have a reproducible value it is necessary to very accurately position the electrodes 4, 5, 6 and 7 relative to the edge 2 of the depression made in header 1. To prevent undesired pull-in of the oscillators due to their very close oscillating frequencies it is necessary to bring about the greatest possible reduction of the stary couplings between the oscillating links. It is pointed out that these problems are made even more difficult to solve due to the sparings made in the materials used for reducing manufacturing costs.

Figure 3:
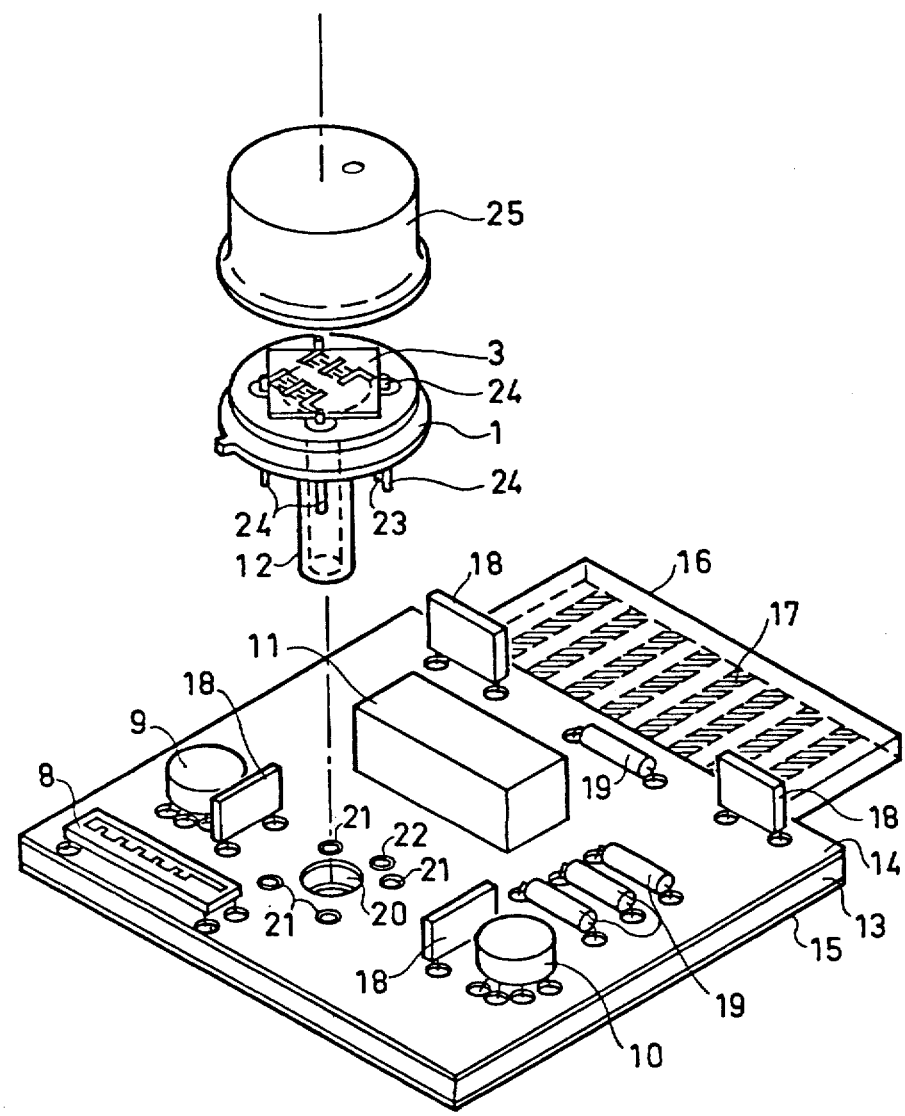
FIG. 3 shows the construction of the pressure gauge according to the invention.

FIG. 3 shows an exploded view of a pressure gauge according to the invention.

The gauge of FIG. 3 essentially comprises a plate carrying the electronic elements, namely amplifiers 9, 10, mixer 11, adjustable delay line 8, by-pass and connecting capacitors 18 and resistors 19 completing the electronic circuit. The plate is made from a double faced laminate having an insulating sheet 13, an upper copper layer 14 forming the earth plane and a lower copper layer 15 which is etched to form the printed circuit. This plate has a connecting tongue 16 provided with conductive strips 17, in such a way that it can be plugged in to the multipole connector not shown in FIG. 3. Device 8 has an indented connection on the insulating sheet. Laser notches can be made in the indented connection to adjust the center frequency of each gauge.

As shown in FIG. 3 electromechanical elements, i.e. the elastic surface wave delay lines formed on piezoelectric wafer 3 are grouped in a pressure sensor which essentially comprises a rigid metal header 1 which is peripherally provided with insulated connecting pins 24. Pins 24 traverse header 1 by means of tightly sealed bushings. Header 1 can be covered with a cap 25, which can have means permitting a vacuum to be formed after assembly (measurement of an absolute pressure). Cap 25 can also have a balancing orifice when the gauge has to measure a vacuum.

The pressure sensor is fitted to the gauge plate by plugging pins 24 into a system of connecting bushes or units 21 arranged around an orifice 20 on the plate. The function of orifice 20 is to enable the pressure inlet 12 fixed to header 1 to pass through the plate during the installation of the pressure sensor.

Figure 4:
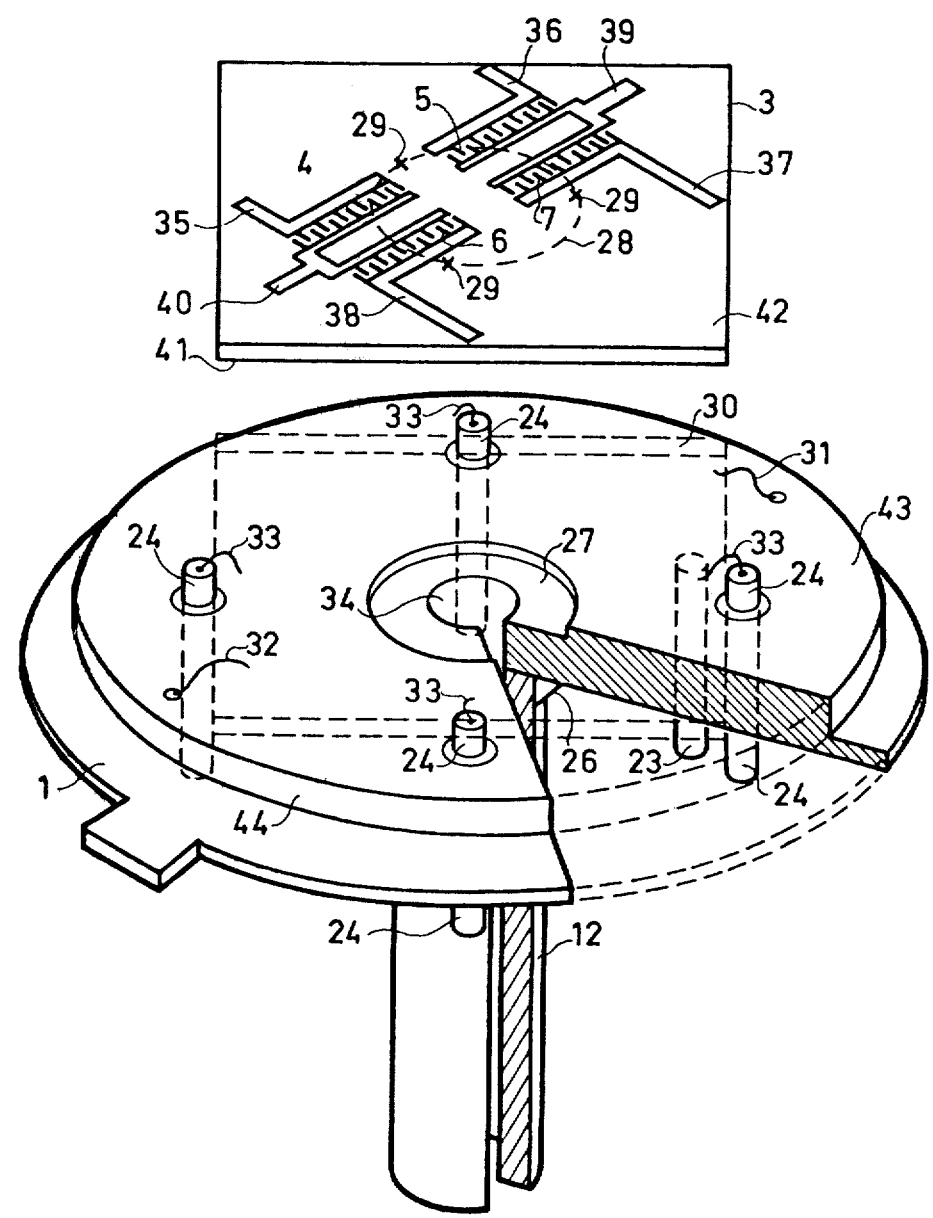
FIG. 4 shows the structure of a pressure sensor which can be used in the pressure gauge of FIG. 3.

FIG. 4 is a large scale view of header 1 and the piezoelectric wafer of the pressure sensor according to the invention.

Header 1 has a support surface for piezoelectric wafer 3 which is placed between the projecting portions of connecting pins 24. Thus, the accurate positioning of wafer 3 relative to header 1 is ensured. A depression 27 is provided in the center of the support surface of the header to define the portion of wafer 3 required to deform and which is effectively exposed to pressure p. The contour of depression 27 is reproduced by a dotted line circumference 28 on the upper face of wafer 3. Cruciform marks 29 deposited at the same time as the configurations of electrodes 4, 5, 6 and 7 make it possible to accurately position contour 28, which is not in fact visible on wafer 3. During the cementing of wafer 3 to the upper face of the header it is possible to check by microscopic examination that the marks 29 are in fact directly above the edge of depression 27.

Header 1 has a peripheral shoulder 44 permitting the fitting of a cap 25. The header cap assembly only differs from known encapsulating means through the presence of depression 27 and the addition of pipe 12 brazed by means of a joint 26 to the bottom of header 1. Header 1 is previously provided with an orifice 34 connecting depression 27 and pressure inlet 12. The header shown in FIG. 4 can be obtained by starting, for example, with a metal semiconductor header known under the reference TO 8. Header TO 8 is normally provided with four insulating pins 24 arranged in the form of a square and a supplementary pin 23 for grounding purposes and which also serves as a key for foolproof positioning.

FIG. 3 shows that the plate has an grounding connection 22 connected to the earth plane 14. The bottom of header 1 forms with the metal pipe 12 and the earth conductor 14 a very effective shielding means which prevents any unwanted stray coupling of the oscillating loops. The configuration of the metal deposition of the transducer fingers on wafer 3 is visible in the large scale view of FIG. 4. The transducer fingers 4, 5, 6 and 7 have external edges which are extended towards the edge of wafer 3 by tabs 35, 36, 37 and 38 connected to pins 24 by very short connecting wires 33 following the cementing of the wafer. The inner edges of the transducers form with tabs 39 and 40 Y-shaped connections which are earthed by the connecting wires 32, directly connected to header 1. This ensures a good insulation of the oscillating loops. The transducers are arranged in an oblique manner relative to the edges of wafer 3, which aids the dispersion of the elastic surface waves meeting the edges of wafer 3. The inner face 41 of wafer 3 is cemented to header 1 in the entire zone surrounding circumference 28. Thus, depression 27 is covered by a portion of wafer 3 which is free to deform, but as the elastic surface waves propagate on the other face 42 and as the adhesive joint also serves as a sealing joint, it is apparent that moisture and impurities which may be present in the pressure inlet 12 have no disadvantageous influence on the exchange of the elastic surface wave. The limited depth of depression 27 and the mechanical reinforcement provided by the brazing joint 26 ensures a good overall rigidity of the assembly permitting its use as a support for the satisfactory fitting of the periphery of wafer 3.

As a result of the modular construction of the gauge of FIG. 3 the pressure sensor of FIG. 4 constitutes an independent component, whose manufacture and operational control are completely independent of the manufacture and the overall control of the pressure gauge. This increases the flexibility of the manufacturing process. Since, in addition, the pressure sensor has a morphology which is very close to that of other electronic components, the machines used in the manufacture of gauges are immediately available for other manufacturing processes and vice versa. It is obviously possible to have a detachable connection between the sensor and the gauge plate or, conversely, there can be a permanent connection by welding the connecting pins.

It is finally pointed out that the pressure gauge assembly of FIG. 3 can be embedded by immersion or moulding, which satisfactorily secures the sensor to the plate. Mechanical tension or pulling exerted on the pressure inlet are well tolerated by the gauge following said immersion due to the sealing of pipe 12 in the plate orifice 20.

What is claimed is:

1. An elastic surface wave pressure gauge comprising:
   a plug-in unit including two delay lines formed by interdigitated comb shaped transducer electrodes placed on a first main face of a piezoelectric wafer, the wafer resting by its second main face on the periphery of a chamber communicating with a pressure inlet, and
   two amplifier circuits oscillating at two different frequencies, one amplifier being connected to each delay line, the difference between these two frequencies being detected by a mixer stage which supplies a measuring signal indicative of a pressure within said chamber,
   the amplifier circuits and the mixture stage being mounted on a circuit board having a ground plane and provided with connections surrounding an orifice providing a passage for the pressure inlet,
   the pressure inlet being being formed as part of the plug-in unit and being constituted by a metal pipe fixed to a rigid metal header, whose periphery is provided with pins which are inserted in said connections, the pins and metal pipe extending outwardly from the piezoelectric wafer, said header having a support for the piezoelectric wafer between the pins, this support having a central depression communicating with the pipe, the metal pipe and header being electrically connected with the ground plane of the board to provide electrical shielding for minimizing pull-in between the two amplifier circuits oscillating at different frequencies.

2. A gauge according to claim 1, wherein the circuit board is formed from a double faced laminate, the copper-coated face on the side for installing the components serving as said ground plane, while the other copper-coated face is etched so as to form the interconnections and also a connecting system permitting the board to be plugged on to a flat multipole connector.

3. A gauge according to claim 1, wherein the connections surrounding the board orifice are bushings permitting a disconnectable connection with the pins.

4. An elastic surface wave pressure sensor comprising: a pressure inlet, a piezoelectric wafer provided with interdigitated comb-shaped transducer electrodes forming on one of its main faces two delay lines which are sensitive to deformations of the wafer and a wafer support having a cavity linking the other face of the wafer and the pressure inlet, wherein the support is a rigid metal header which is peripherally provided with connecting pins having extensions surrounding a central metal pipe fixed to the header by one of its faces, the metal pipe and pins extending outwardly from the piezoelectric wafer the other face of the header having a depression which is connected to the pipe, the wafer resting on the edge of the depression and between the extensions of the connecting pins the central metal pipe and header being adapted to provide, when interconnected with a circuit board including oscillator circuits for measuring the deformation of the wafer, electrical shielding for inhibiting a pull-in of said oscillator circuits.

5. A sensor according to claim 4, wherein the face of the wafer carrying the interdigitated comb transducer electrodes has positioning marks which must be positioned directly above the contour of the depression made in the header.

6. A sensor according to claim 4, wherein the piezoelectric wafer forms a quadrilateral and wherein the connecting pins of the header are arranged so as to be tangential thereto.

7. A sensor according to claim 4, wherein the header is a JEDEC TO 8 header.

8. A sensor according to claim 4, wherein the transducer comb electrodes form two parallel alignments oriented in an oblique manner relative to the edges of the piezoelectric wafer for dispersing spurious reflected waves to edges of the wafer rather than to an electrode.

9. A sensor according to claim 8, wherein the edges of the transducer electrodes defining the separation between the two alignments are interconnected and are connected to the header, a connecting pin of the header being electrically connected to the edges, the other pins which are insulated from the header are respectively connected to the other edges of the transducers.

10. A sensor according to claim 4, wherein the header has a peripheral shoulder, a protective cap being mounted and fixed to the shoulder.

11. A sensor according to claim 10, wherein the cap is sealed to the header.

12. A sensor according to claim 11, wherein a vacuum is formed beneath the cap, the piezoelectric wafer and the connecting pins being sealingly fixed to the header.

13. A sensor according to claim 10, wherein the cap is provided with a pressure balancing orifice.

* * * * *